United States Patent Office 3,503,140
Patented Mar. 31, 1970

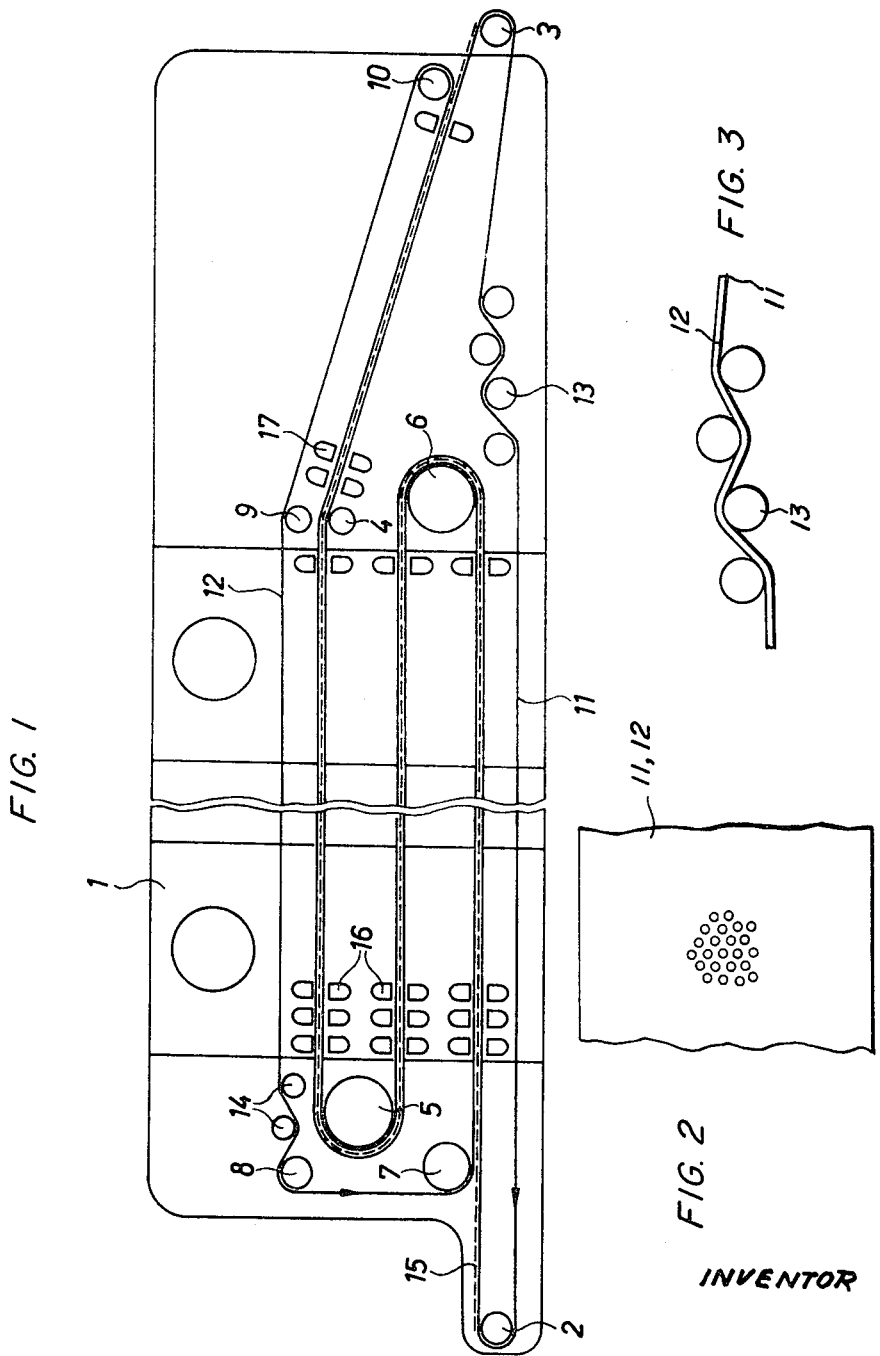

3,503,140
DRIER FOR SHEET MATERIALS
Robert Hildebrand, Nuertinger Str. 68,
Oberboihingen, Wurttemberg, Germany
Filed Jan. 11, 1967, Ser. No. 613,066
Claims priority, application Germany, Jan. 12, 1966,
H 58,215
Int. Cl. F26b 9/00
U.S. Cl. 34—162                                    4 Claims

ABSTRACT OF THE DISCLOSURE

A drier for continuously drying sheet materials by means of at least two heated endless conveyor belts which directly engage upon the opposite sides of the sheets and directly transmit the drying heat thereto and also smooth the surfaces thereof while carrying the sheets through the drier. In order to reduce the dimensions of the drier, the continuously moving conveyor belts preferably pass back and forth several times on guide rollers.

BACKGROUND OF THE INVENTION

The present invention relates to a drier for continuously drying sheet materials, especially veneers and plywood sheets, but also paper, cardboard, felt or similar materials which comprises at least two associated conveyor belts which are movable on guide rollers and are adapted to hold the sheets between them and to convey them through the drier.

SUMMARY OF THE INVENTION

It is an object of the present invention to provide a drier of the above-mentioned type which permits sheet materials to be dried continuously by contact drying. This object is attained according to the invention by providing the sides of the conveyor belts facing the sheet material with contact surfaces for directly engaging with the material, and by designing these belts so as to cover the sheet material to be dried in such a manner that the drying heat will be transmitted substantially and directly by the conveyor belts to the sheet material. The conveyor belts preferably consist of steel bands either with or without perforations or of closely-woven wire netting with smooth outer surfaces. In any event, the contact surfaces on both conveyor belts which come into intimate engagement with the sheet material, for example, veneer or plywood sheets, should be as smooth as possible. When such a veneer or plywood sheet is passed between the two conveyor belts, it will be subjected by the latter to a smoothing or ironing process which improves the quality of the sheets. The total surface area of the contact surface of each conveyor belt is preferably larger than one-half of the total surface area of the belt itself.

According to another feature of the invention, the mentioned smoothing or ironing effect may be further increased by guiding the part of the conveyor belts which come in contact with the opposite sides of the material to be dried so as at least partly to form waves in the direction transverse to the direction of travel of the belts and the material to be dried between them. The associated parts of the upper and lower belts are thereby pressed more intimately against each other and thus against the sheet material between them.

By providing the conveyor belts with special contact surfaces, it is also possible to bend the sheet material and reverse its direction of travel by means of guide rollers without causing high specific surface pressures which might damage or ruin the sheet material. Consequently by mounting the guide rollers so as to reverse the direction of travel of the conveyor belts repeatedly, it is possible to attain a drier of relatively small outer dimensions which produces very efficient drying results. This may be attained according to the invention by passing at least one of the conveyor belts along an upper part and a lower part of the other belt and around a guide roller which also serves for guiding the first conveyor belt. If the drier according to the invention is to be employed for drying veneers or plywood sheets, it may be built into a production line so as to follow a veneering saw. In this case, however, it is advisable to provide an automatic feeding mechanism for the drier between the veneering saw and the drier in which the veneers or plywood sheets may be temporarily stored while the operation of the veneering saw is stopped, for example, for the purpose of changing tree trunks.

Instead of providing the drier with only two endless conveyor belts above and below the material to be dried, it is, of course, also possible to provide two or more endless conveyor belts on either side of the material directly behind each other, as seen in the direction of travel, by mounting two guide rollers for the adjacent belts closely adjacent to each other.

These and further features and advantages of the present invention will become more clearly apparent from the following detailed description thereof which is to be read with reference to the accompanying diagrammatic drawing which shows a longitudinal section of the new drier as FIG. 1; FIG. 2 is a plan view of a portion of the belt; and FIG. 3 is an end view of the belt between rollers.

As illustrated in this drawing, the drier comprises a housing 1 in or on which nine guide rollers 2 to 10 are rotatably mounted. Guide rollers 5 and 6 have a considerably larger diameter than the other guide rollers. Guide rollers 2 to 6 guide an endless conveyor belt 11 which may consist, for example, of a solid or perforated steel band with smooth outer surfaces or of a closely-woven, flat or flat-rolled wire band or a flat band made of spirally or zigzag-shaped wire. If this belt 11 is perforated, FIG. 2, due to perforations punched therein or due to its weaving or other manner of manufacture, these perforations are preferably spaced at the smallest possible distance from each other without excessively reducing the solidity of the belt. Such perforations may be of a round, elongated, square, rectangular, or any other suitable shape. Guide rollers 4 to 10 guide another endless conveyer belt 12 which may be of a construction similar to that of the conveyer belt 11. Aside from being guided by the guide rollers 2 to 6, the conveyer belt 11 also passes under or over several tightening rollers 13, FIG. 3 which are adjustable to different levels so as to tighten the belt. For tightening the other conveyer belt 12, a pair of adjustable tightening rollers 14 are provided. Each of the conveyer belts 11 and 12 is guided so as to define a U-shaped surface, as seen in a side view, wherein one arm of the U which is defined by one conveyer belt engages into the corresponding arm of the U which is formed by the other conveyer belt. Between the areas of the two belts 11 and 12 which are disposed between the guide rollers 7, 6, 5, 4, 3 and 10, the two belts are located so closely to each other that, when veneer or plywood sheets 15 are inserted between them they will be firmly gripped by and be in initimate contact at all points with the two belts so that a smoothing or ironing effect will be exerted upon the sheets 15 and their quality will thereby be improved.

For increasing this ironing effect it is also possible to provide additional guide rollers (not shown) at both sides of the two conveyer belts 11 and 12 within the mentioned area in which the veneer or plywood sheets 15 are guided by both belts and to mount these rollers so as to be slightly offset relative to each other similarly to the tightening rollers 13, so that the sheets 15 will run under and over adjacent rollers and thus in a wavy direction.

At both sides of the areas of the two belts 11 and 12 between which the veneer or plywood sheets 15 are running, the drier is further provided with nozzle boxes 16 from which hot air may be blown upon the conveyer belts 11 and 12. The two belts may, however, also be heated directly by radiation or other suitable heating means. Subsequent to the drying area, the drier may be further provided with a cooling area by mounting additional nozzle boxes 17 near the end of the drier from which cooling air may be blown upon the two belts 11 and 12. For dissipating the moisture which evaporates from the veneer or plywood sheets 15, it is advisable to provide a plurality of ventilating fans, not shown, at suitable points within the housing 1 and also to provide the housing with adjustable air inlet and outlet openings which are likewise not shown.

The conveyer belts 11 and 12 are driven in the direction as indicated by the arrows. Guide roller 2 for the conveyer belt 11 is located more forwardly than the guide roller 7 for the conveyer belt 12 so as to permit the veneer or plywood sheets 15 to be easily placed upon the belt 11 which at the position of guide roller 7 pass between both belts 11 and 12 and are subsequently taken along by them and passed around the guide rollers 6 and 5. During the travel of both belts from guide roller 7 to guide roller 4, hot air is blown upon them from the nozzle boxes 16 so as to heat the belts which then transmit the heat directly to the veneer or plywood sheets 15 between them. Between the guide rollers 4, 10 and 3 the two belts are downwardly inclined so that the outlet for the sheets 15 will be located at substantially the same level as the inlet. At the outlet side, guide roller 3 for the conveyer belt 11 is mounted more forwardly than guide roller 10 so as to permit the veneer or plywood sheets to be easily removed from the drier.

Although the drier according to the invention may be made of any other dimensions, its total length may be, for example, about 16 m., its total width about 6 m., and its maximum height about 4 m., while each of the conveyer belts may have a width of about 4 m. The heated area of the belts may have a length of about 24 m. and the cooling area may have a length of about 4 m. The traveling speed of the conveyer belts may amount, for example, to 30 m./minute.

Although the drier according to the invention has been illustrated in the drawing as being provided with only two long endless conveyer belts, it may sometimes be desirable to employ shorter belts by providing two or more separate shorter belts directly behind each other at one or both sides of the material to be dried. The guide rollers for the adjacent belts should then be mounted parallel to each other and as closely as possible without causing the adjacent belts to interfere with each other. Thus, for example, instead of reversing the direction of travel of the conveyer belt 12 by means of the guide roller 10 at the outlet side of the drier, it is also possible to employ a shorter belt 12 and reverse its direction by passing it around the guide roller 9 and to provide directly adjacent thereto another guide roller for guiding a separate conveyer belt between this additional guide roller and the guide roller 10. This additional conveyer belt would then serve for removing the sheet material from the drying area, cooling it by means of the cooling-air nozzles 17, and passing it toward the outlet roller 3 of the drier.

Since the drying process is carried out continuously along three different levels, it is possible to make the drier of relatively small dimensions and to mount it within a production line leading from a veneering saw with an automatic discharging device to an automatic device for feeding the veneer or plywood sheets into the drier. This feeding device is preferably capable of storing the sheets for the length of time which is required for changing the tree trunks in the veneering saw. At the outlet side of the drier, the veneer or plywood sheets may be removed by hand, although this may also be done mechanically.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. A drier for continuously drying sheet veneer materials comprising at least two endless conveyor belts, guide rollers for guiding said belts in superimposed relationship over a certain section of the length of the belts which latter have contact surfaces facing one another within said section and are adapted to engage directly upon and to take along sheet material inserted between said belts, means for applying sensible heat to both belts over at least one portion of said section lying between successive guide rollers so as to cause the belts to absorb the heat and to conduct the heat directly to said sheet material for drying the same, some of said guide rollers being mounted at least within a part of said section so as to form corrugations in the shape of waves of an amplitude small in comparison with the lengths of said belts, the lines of the crests and troughs of the waves being transverse to the direction of travel of the belts.

2. A drier for continuously drying sheet veneer materials comprising at least two endless conveyor belts, guide rollers for guiding said belts in superimposed relationship over a certain section of the length of the belts which latter have contact surfaces facing one another within said section and are adapted to engage directly upon and to take along sheet material inserted between said belts, means for applying sensible heat to both belts over at least one portion of said section lying between successive guide rollers so as to cause the belts to absorb the heat and to conduct the heat directly to said sheet material for drying the same, some of said guide rollers being mounted near the opposite ends of said drier so as to form an inlet and an outlet for said sheet material, said inlet and outlet being disposed at substantially the same level, said guide rollers near said outlet being disposed at different levels so as to lead said belts at a downward inclination toward said outlet, and said guide rollers at least for said heated section of said belts being mounted so as to guide said belts in substantially horizontal directions between said rollers, said downwardly inclined part of said belts leading from said heated section toward said outlet and forming a cooling section and cooling means for cooling said belts within said cooling section.

3. A drier for continuously drying sheet veneer materials comprising at least two endless conveyor belts, guide rollers for guiding said belts in superimposed relationship over a certain section of the length of the belts which latter have contact surfaces facing one another within said section and are adapted to engage directly upon and to take along sheet material inserted between said belts, means for applying sensible heat to both belts over at least one portion of said section lying between successive guide rollers so as to cause the belts to absorb the heat and to conduct the heat directly to said sheet material for drying the same, cooling means disposed at the trailing end of said heated portion relative to the direction of travel of the belts for cooling said belts and said sheet material between them.

4. A drier for continuously drying sheet materials comprising at least two endless conveyor belts, guide rollers for guiding said belts in superimposed relationship over a certain section of the length of the belts which latter have contact surfaces facing one another within said section and are adapted to engage directly upon and to take along sheet material inserted between said belts and means for applying sensible heat to both belts over at least one portion of said section lying between successive guide rollers so as to cause the belts to absorb the heat and to conduct the heat directly to said sheet material for drying the same, in which at least one of said belts extends along an upper and a lower section of the other belt and together with the other belt around at least one of said guide rollers, in which at least said section of said belts defines a U-shaped path of travel as seen in a side view, wherein said U-path of one of said belts engages between the U-path of the other belt, in which some of said guide rollers are mounted near the opposite ends of said drier so as to form an inlet and an outlet for said sheet material, said inlet and outlet being disposed at substantially the same level, said guide rollers near said outlet being disposed at different levels so as to lead said belts at a downward inclination toward said outlet, in which said guide rollers at least for said heated section of said belts are mounted so as to guide said belts in substantially horizontal directions between said rollers, said downwardly inclined part of said belts leading from said heated section toward said outlet and forming a cooling section, futher comprising cooling means for cooling said belts within said cooling section, further comprising cooling means disposed at the trailing end of said heated portion relative to the direction of travel of the belts for cooling said belts and said sheet material between them.

References Cited

UNITED STATES PATENTS

| | | |
|---|---|---|
| 1,741,882 | 12/1929 | Robinson. |
| 1,878,236 | 9/1932 | Griffin _____ 34—111 XR |
| 2,133,424 | 10/1938 | Buckwalter _____ 34—159 XR |
| 3,077,673 | 2/1963 | Cohen et al. ____ 34—116 XR |
| 3,325,911 | 6/1967 | Fleisher et al. ___ 24—162 XR |
| 3,368,933 | 2/1968 | Wicker _____ 34—162 XR |
| 1,573,379 | 2/1926 | Elmendorf _____ 34—23 XR |
| 3,084,448 | 4/1963 | Dungler _____ 34—155 |

FREDERICK L. MATTESON, JR., Primary Examiner

HARRY B. RAMEY, Assistant Examiner